US008945422B2

(12) United States Patent
Yokoyama et al.

(10) Patent No.: US 8,945,422 B2
(45) Date of Patent: Feb. 3, 2015

(54) METHOD OF OPERATING RUTHENIUM CATALYST REACTOR

(75) Inventors: Kota Yokoyama, Amagasaki (JP); Naoki Inoue, Higashiosaka (JP); Koichiro Ikeda, Sakai (JP); Fuyuki Noguchi, Hyogo (JP)

(73) Assignee: Osaka Gas Co., Ltd., Osaka (JP)

( * ) Notice: Subject to any disclaimer, the term of this patent is extended or adjusted under 35 U.S.C. 154(b) by 286 days.

(21) Appl. No.: 12/999,232

(22) PCT Filed: Jun. 11, 2009

(86) PCT No.: PCT/JP2009/060674
§ 371 (c)(1),
(2), (4) Date: Mar. 7, 2011

(87) PCT Pub. No.: WO2009/154128
PCT Pub. Date: Dec. 23, 2009

(65) Prior Publication Data
US 2011/0147667 A1    Jun. 23, 2011

(30) Foreign Application Priority Data

Jun. 16, 2008  (JP) ................................ 2008-156926
Jun. 16, 2008  (JP) ................................ 2008-156927

(51) Int. Cl.
*C01B 3/40*      (2006.01)
*B01J 4/00*      (2006.01)
(Continued)

(52) U.S. Cl.
CPC ............... *B01J 4/002* (2013.01); *B01J 8/0035* (2013.01); *B01J 8/025* (2013.01); *B01J 8/0278* (2013.01); *B01J 8/0453* (2013.01); *B01J 23/462* (2013.01); *C01B 3/40* (2013.01);
(Continued)

(58) Field of Classification Search
USPC ...................... 423/359, 644, 648.1, 650, 651; 48/127.9, 198.8, 198.7, 198.6, 197 FM; 252/373
See application file for complete search history.

(56) References Cited

U.S. PATENT DOCUMENTS 4,152,299 A    5/1979  Gandhi et al.
5,112,527 A    5/1992  Kobylinski
(Continued)

FOREIGN PATENT DOCUMENTS

EP     1930076 A1   6/2008
JP      26799 A     1/1990
(Continued)

*Primary Examiner* — Stanley Silverman
*Assistant Examiner* — Syed Iqbal
(74) *Attorney, Agent, or Firm* — The Webb Law Firm

(57) ABSTRACT

A catalytic reactor including: a reaction container filled with a catalyst having ruthenium; and an introduction part for introducing a material fluid to the reaction container. The reaction container is supplied with a mixed gas as material fluid to produce synthetic gas containing hydrogen and carbon monoxide in the presence of the catalyst. The introduction part is connected to the reaction container in a horizontal direction or a direction inclined downward from above a horizontal plane, and a height of the catalyst filled in the reaction container is adjusted above a height at which the material fluid is fed from the introduction part to the reaction container. Also, a method of using the catalytic reactor including monitoring a molar ratio of carbon and oxygen contained in the material fluid and stopping the supply of an oxygen-containing gas to the reaction container before the molar ratio becomes excessively low.

5 Claims, 5 Drawing Sheets

(51) Int. Cl.
  *B01J 8/00* (2006.01)
  *B01J 8/02* (2006.01)
  *B01J 8/04* (2006.01)
  *B01J 23/46* (2006.01)

(52) U.S. Cl.
  CPC .......... *B01J 2208/00061* (2013.01); *B01J 2208/00495* (2013.01); *B01J 2208/00548* (2013.01); *B01J 2208/00752* (2013.01); *B01J 2208/00769* (2013.01); *B01J 2208/00849* (2013.01); *B01J 2208/00884* (2013.01); *B01J 2208/025* (2013.01); *C01B 2203/0244* (2013.01); *C01B 2203/0261* (2013.01); *C01B 2203/1064* (2013.01); *C01B 2203/1619* (2013.01); *C01B 2203/169* (2013.01)
  USPC ......... 252/373; 48/127.1; 48/127.3; 48/198.1

(56) References Cited

U.S. PATENT DOCUMENTS

| | | | |
|---|---|---|---|
| 5,510,056 | A | 4/1996 | Jacobs et al. |
| 2004/0144320 | A1 | 7/2004 | Hasebe et al. |
| 2005/0013752 | A1 | 1/2005 | Fujii et al. |
| 2006/0029539 | A1* | 2/2006 | Dutta et al. .................. 423/651 |
| 2008/0224097 | A1 | 9/2008 | Fujie et al. |
| 2008/0263953 | A1 | 10/2008 | Okada et al. |
| 2009/0212259 | A1 | 8/2009 | Noguchi et al. |

FOREIGN PATENT DOCUMENTS

| | | |
|---|---|---|
| JP | 200313232 A | 1/2003 |
| JP | 2003286004 A | 10/2003 |
| JP | 200547795 A | 2/2005 |
| JP | 200769151 A | 3/2007 |
| WO | 2006001438 A1 | 1/2006 |
| WO | 2006134887 A1 | 12/2006 |

* cited by examiner

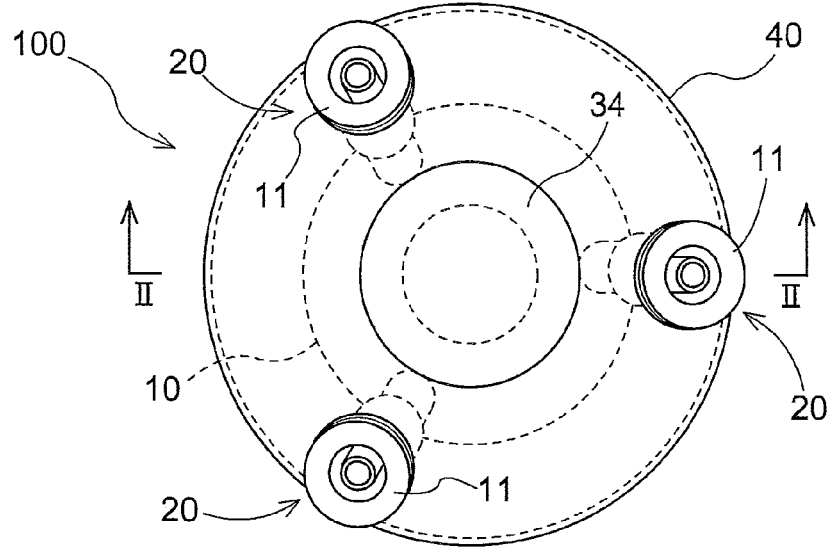
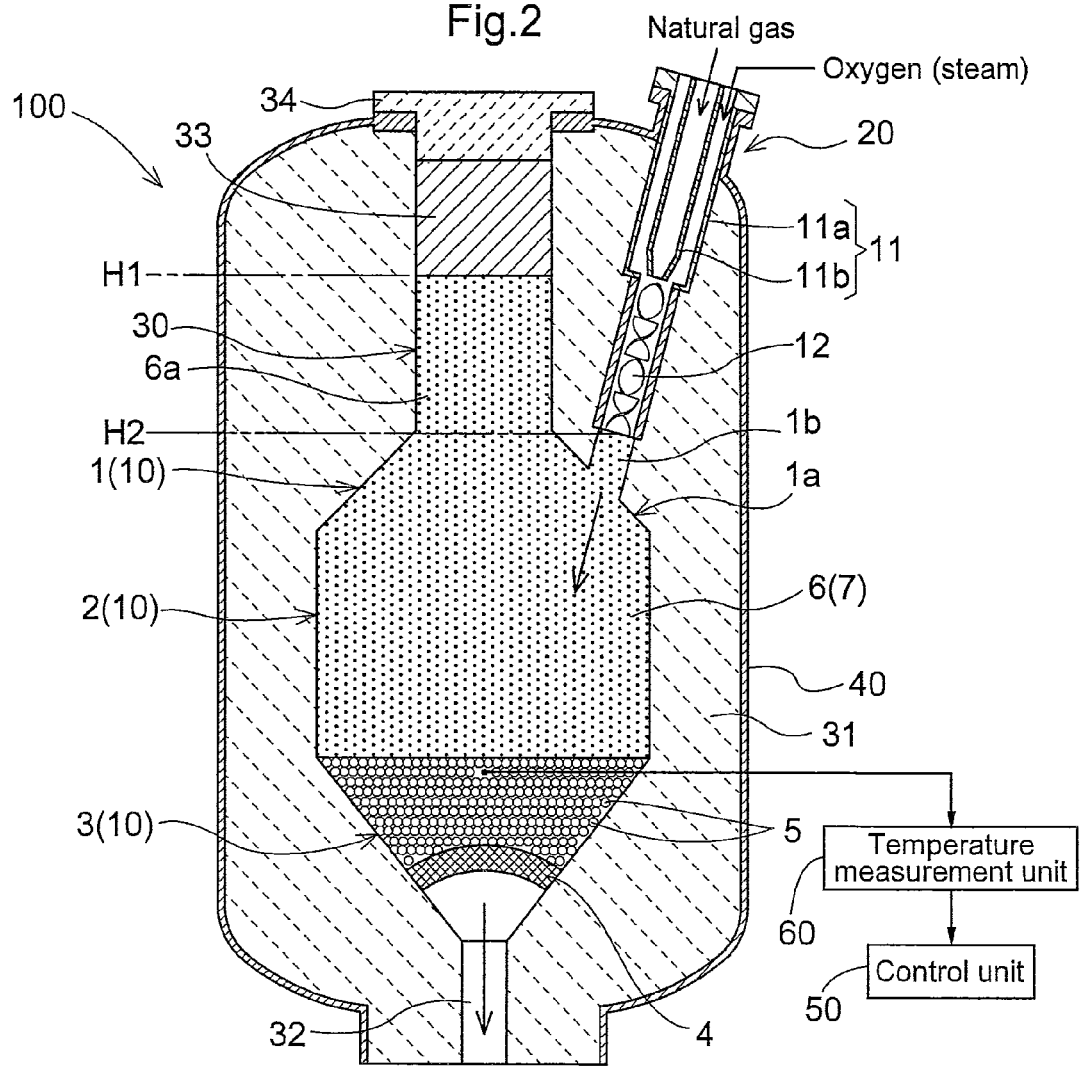

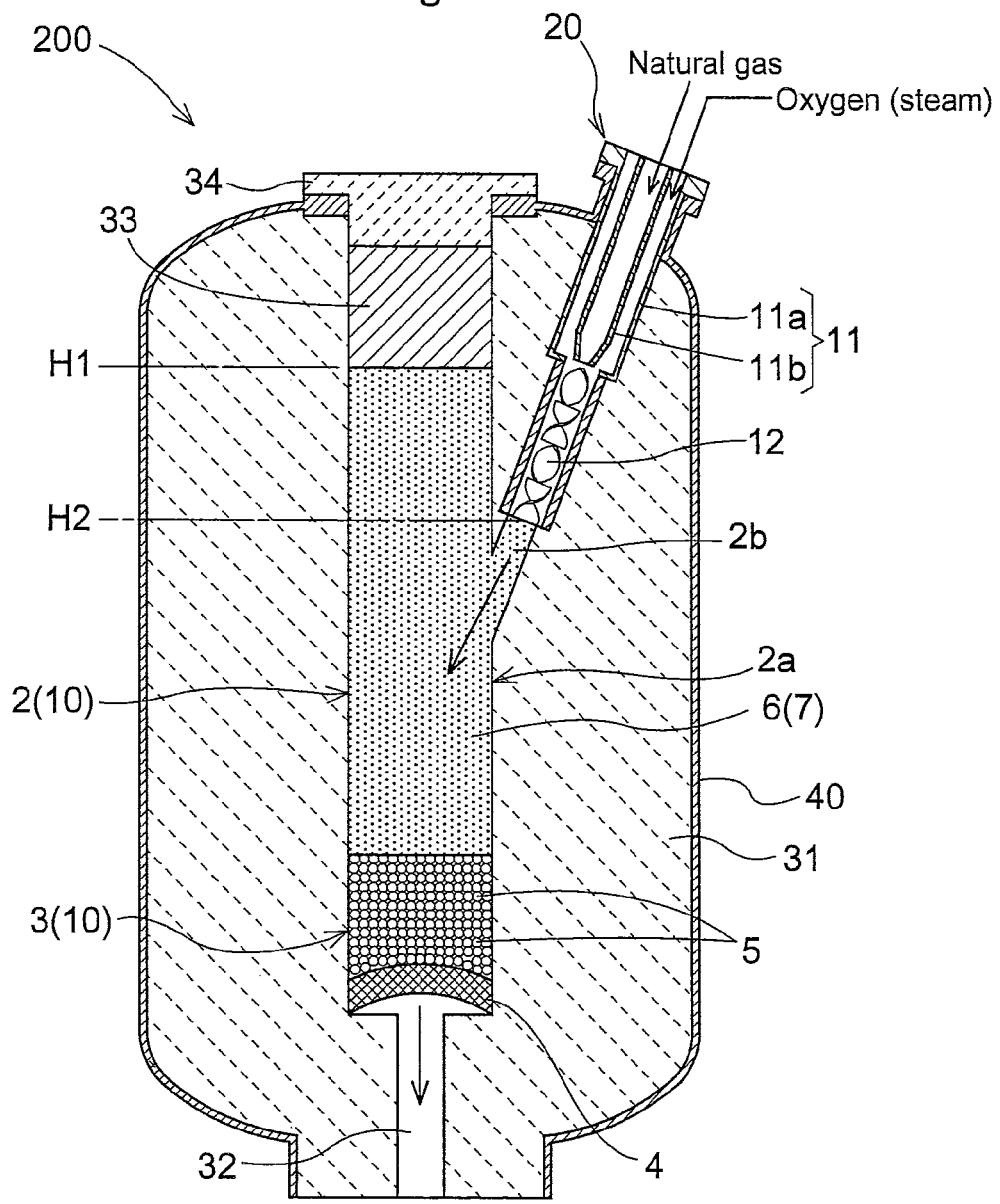

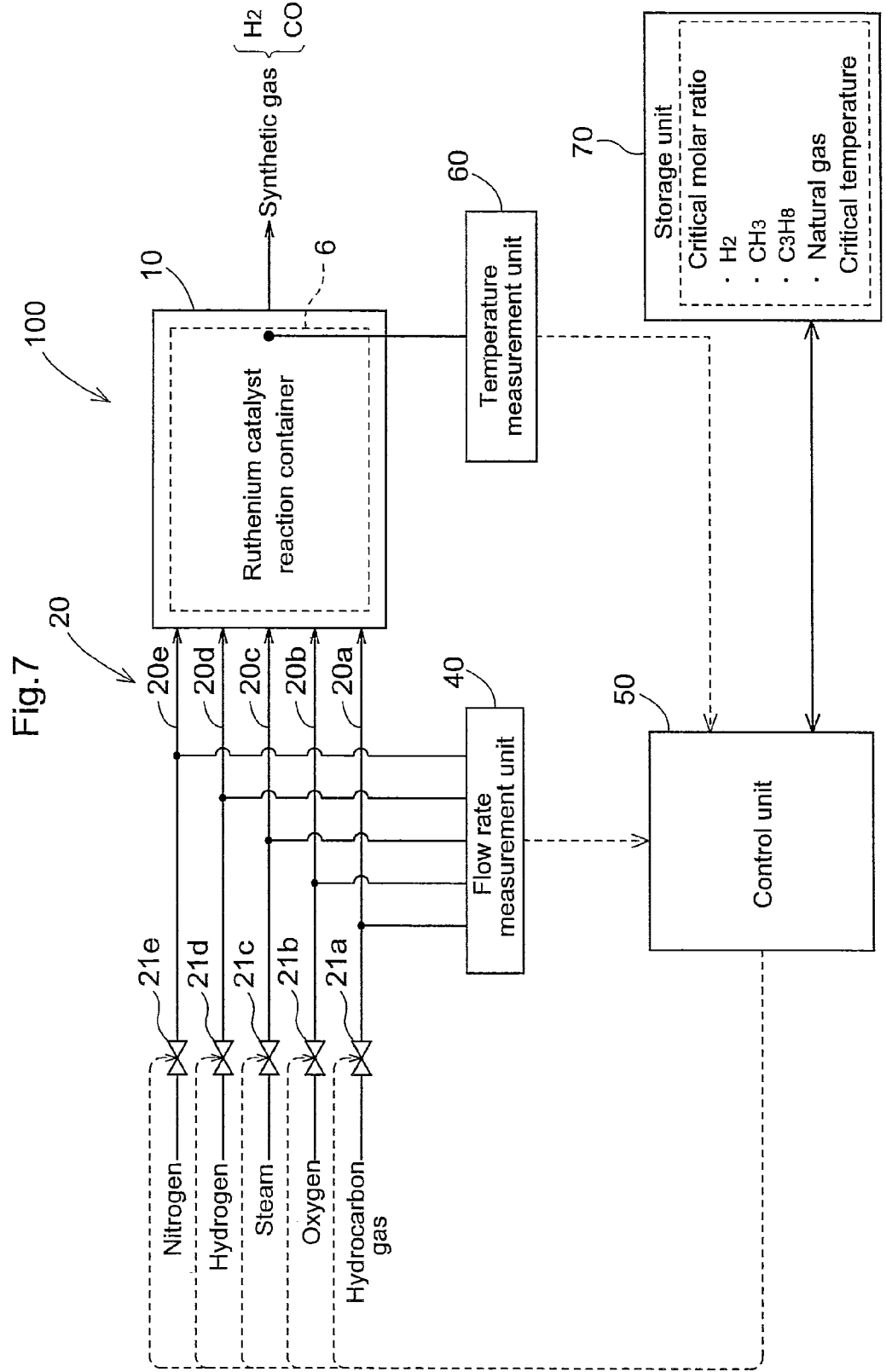

METHOD OF OPERATING RUTHENIUM CATALYST REACTOR

TECHNICAL FIELD

The present invention relates to a method of operating a ruthenium catalyst reactor, including steps of: supplying hydrocarbon gas, steam and oxygen-containing gas to a reaction container having a ruthenium catalyst therein, allowing a partial oxidation reaction to proceed in the presence of the ruthenium catalyst, and producing synthetic gas containing hydrogen and carbon monoxide.

BACKGROUND ART

Synthetic gas, mainly containing hydrogen and carbon monoxide both obtained from natural gas containing methane as main component, has been an important industrial material and used as raw material for methanol production, ammonia production, oxo synthesis, or the like. In production of hydrocarbon fuel, such as GTL (gas to liquids) and DME (dimethyl ether) synthesis which have recently drawn attention as environment-friendly fuel, a common production method includes steps of once converting natural gas as raw material into such synthetic gas and performing GTL or the synthesis of DME.

There are various methods for producing synthetic gas from natural gas, and four basic methods include a steam reforming process, a partial combustion process, an autothermal reforming, and a catalytic partial oxidation process. Among these, the catalytic partial oxidation process, which is related to the present invention, is a process in which a hydrocarbon material (e.g., natural gas), steam, and oxygen-containing gas (e.g., air and pure oxygen) are supplied to a reaction container having a catalyst therein, and a partial oxidation reaction of hydrocarbon is advanced in the presence of the catalyst. As one example of the catalytic reactor for such a partial oxidation reaction, there can be mentioned a vertical reaction tube disclosed in U.S. Pat. No. 5,112,527.

In addition, for the catalytic partial oxidation process, for example, there has been known a process in which natural gas, steam and oxygen are supplied to a reaction container having a ruthenium catalyst therein, and the partial oxidation reaction is allowed to proceed in the presence of the ruthenium catalyst to thereby obtain synthetic gas (see, for example, Japanese Patent Unexamined Application Publication No. 2007-69151).

A partial oxidation reaction of methane in the presence of the catalyst advances chiefly with the following reactions (1)-(4):

$$CH_4 + \tfrac{1}{2}O_2 \rightarrow 2H_2 + CO \quad (1)$$

$$CH_4 + 2O_2 \rightarrow CO_2 + 2H_2O \quad (2)$$

$$CO + H_2O \longleftrightarrow CO_2 + H_2 \quad (3)$$

$$CH_4 + H_2O \longleftrightarrow CO + 3H_2 \quad (4)$$

Until oxygen fed from a reaction container inlet is used up, the reactions (1) and (2) are predominant, and after the oxygen has run out, the equilibrium reactions (3) and (4) proceed. In the catalytic partial oxidation reaction, the reactions (1) and (2) may occur in a gas phase, since a reaction gas (material fluid) to be introduced to the catalyst is a premixed gas containing the hydrocarbon and the oxygen. In a case where the reactions (1) and (2) occur in the gas phase before the reaction gas reaches the catalyst, troubles arise such as carbon precipitation and backfire, and thus after mixing the hydrocarbon and the oxygen, it is notably important to carefully operate the reactor in such a manner that the reactions (1) and (2) do not occur in the gas phase before the reaction gas reaches the catalyst.

As catalyst to be used in such a reaction system, a ruthenium catalyst has been known. It has been known that, in a completely oxidative atmosphere, ruthenium in the ruthenium catalyst is oxidized to ruthenium oxide. Representative forms of ruthenium oxide include $RuO_2$, $RuO_3$ and $RuO_4$. From among these, $RuO_3$ and $RuO_4$ are volatile and likely to scatter. Therefore, in a case where the partial oxidation reaction is performed using the ruthenium catalyst, attention should be paid to an operation condition so as to prevent scattering which may be caused by excessive oxidation of ruthenium.

SUMMARY OF INVENTION

Technical Problem

However, in a catalytic reactor with a vertical reaction tube, such as those described in U.S. Pat. No. 5,112,527, there may be cases in which an internal volume is increased by, for example, thermal expansion of the reaction container, and the catalyst is moved downward to reduce its apparent volume relative to the reaction container, resulting in a space generated in the reaction container. In addition, if the catalyst is not filled in a close packed state at the beginning, the catalyst is moved downward during the operation of the catalytic reactor, resulting in a space generated in the reaction container.

It should be noted that these downward movements of the catalyst herein are referred to as "shrink" of a catalytic layer. With respect to this shrink, various factors are considered to be present other than those described above, and it is difficult to completely eliminate the shrink by an advance preparation.

In the reactor of a downflow type in which the material fluid is flowed from an upper side to a lower side, such as those described in U.S. Pat. No. 5,112,527, the space generated due to the shrink of the catalytic layer is likely to be formed mainly around an outlet of an introduction nozzle (introduction part) of the material fluid, or on a packing upper face of the catalytic layer. In this case, the premixed gas immediately after being fed from the introduction nozzle has a longer retention time in the space upstream of the catalyst inlet where no catalyst is present, or a feed linear velocity of the premixed gas is reduced. As a result, the premixed gas undesirably causes an oxidation reaction in the gas phase, leading to carbon precipitate or backfire to the introduction nozzle.

It should be noted that an upflow type may be used in which the material fluid is flowed from the lower side to the upper side through the reaction container filled with the catalyst. However, in the upflow type, there is a problem that the catalyst becomes flowable due to a supply pressure of the material fluid, and thus it is difficult to obtain a constant excellent reaction. In addition, when the steam to be reacted with the hydrocarbon contained in the material fluid is condensed, dew condensation water is accumulated at a bottom portion of the reaction container. Therefore, the upflow type is considered to be difficult to be applied to the catalytic reactor for performing the partial oxidation reaction.

In addition, when ruthenium is used as catalyst, in the actual contact partial oxidation reaction process, production conditions of the volatile $RuO_3$ and $RuO_4$ change in relation to an amount of natural gas supply, an amount of oxygen supply, an amount of steam supply, and a reaction temperature. However, for operating a conventional ruthenium catalyst reactor, marginal conditions in which ruthenium in the ruthenium catalyst volatilizes (scatters) have not been understood.

Though ruthenium in the ruthenium catalyst rarely volatilizes in the normal operation, when abnormality occurs in the ruthenium catalyst reactor by troubles, such as reduction in the amount of natural gas supply, it is assumed that the scattering of ruthenium in the ruthenium catalyst becomes notable. If ruthenium scatters, a problem arises that the activity of the catalyst is reduced.

The present invention was made with the view toward solving the above-described problems, and an object is to provide a method of using a ruthenium catalyst reactor that can be stably used even when the catalyst in the reaction container shrinks or even when ruthenium is used as catalyst, and specifically, that can prevent a space from being formed in the reaction container even when the catalytic layer formed of the catalyst in the reaction container shrinks, and that can allow the partial oxidation reaction to excellently proceed. The present invention was made also by understanding the condition of ruthenium in the ruthenium catalyst for scattering, and an object is to provide the method that can prevent scattering of ruthenium in advance during the operation of the ruthenium catalyst reactor, by utilizing such a condition.

Solution to Problem

The feature of the method of operating a ruthenium catalyst reactor according to the present invention to attain the above-described object is that the method includes steps of: supplying hydrocarbon gas, steam and oxygen-containing gas to a reaction container having a ruthenium catalyst therein; allowing a partial oxidation reaction to proceed in the presence of the ruthenium catalyst; and producing synthetic gas containing hydrogen and carbon monoxide, and the method further includes steps of: monitoring a molar ratio ($C/O_2$) of carbon contained in the hydrocarbon gas and oxygen contained in the oxygen-containing gas which are supplied to the reaction container, and stopping the supply of the oxygen-containing gas to the reaction container before the molar ratio ($C/O_2$) is reduced below a critical molar ratio at which scattering of ruthenium in the ruthenium catalyst is generated.

According to the method of operating a ruthenium catalyst reactor of the present configuration, the molar ratio ($C/O_2$) of "carbon contained in the hydrocarbon gas" and "oxygen contained in the oxygen-containing gas" supplied to the reaction container having the ruthenium catalyst therein is monitored. In addition, the molar ratio at which the scattering of ruthenium in the ruthenium catalyst occurs is defined as "critical molar ratio". The critical molar ratio is newly established parameter as the result of intensive and extensive studies by the present inventors. Herein, during the operation of the ruthenium catalyst reactor, when the molar ratio ($C/O_2$) is reduced to become close to the critical molar ratio, the supply of oxygen-containing gas to the reaction container is stopped, before the molar ratio ($C/O_2$) falls below the critical molar ratio. Accordingly, the molar ratio ($C/O_2$) is increased (in other words, a reductive atmosphere is obtained), and ruthenium in the ruthenium catalyst is prevented from being oxidized to a volatile ruthenium oxide ($RuO_3$ or $RuO_4$). As a result, the scattering of ruthenium during the operation of the ruthenium catalyst reactor can be prevented, and thus it is not necessary to replace the ruthenium catalyst in the reaction container with a fresh catalyst, and thus the ruthenium catalyst can be continuously used as-is.

Another feature of the method is that the method includes steps of: filling a reaction container of the catalytic reactor with a ruthenium catalyst formed of an inorganic oxide carrier and ruthenium supported thereon, with a filling height level of the catalyst filled in the reaction container being adjusted above a height level at which a material fluid is fed from an introduction part to inside the reaction container; supplying a mixed gas mainly containing hydrocarbon, oxygen-containing gas and steam as the material fluid to the reaction container; allowing a partial oxidation reaction to proceed in the presence of the ruthenium catalyst; and producing synthetic gas containing hydrogen and carbon monoxide, and the method further includes steps of: monitoring a molar ratio ($C/O_2$) of carbon contained in the hydrocarbon gas and oxygen contained in the oxygen-containing gas which are supplied to the reaction container, and stopping the supply of the oxygen-containing gas to the reaction container before the molar ratio ($C/O_2$) is reduced below a critical molar ratio at which scattering of ruthenium in the ruthenium catalyst is generated.

In other words, with such a configuration, in addition to the effects described above, the reduction of the apparent volume of the catalyst in the reaction container, including the shrink of the catalyst in the catalytic reactor, can be comprehensively monitored, and thus deterioration of the catalyst and an abnormal reaction in the reaction container can be efficiently prevented.

In the method of operating a ruthenium catalyst reactor according to the present invention, it is preferable that the partial oxidation reaction is performed with a condition in which a temperature around an outlet of the reaction container is in a range of 900-1,100° C.

According to the method of operating a ruthenium catalyst reactor, the partial oxidation reaction which is allowed to proceed in the presence of the ruthenium catalyst is performed with a preferred condition in which the temperature around the outlet of the reaction container becomes 900-1,100° C., and thus the synthetic gas can be efficiently produced from the hydrocarbon gas as raw material.

In the method of operating a ruthenium catalyst reactor according to the present invention, it is preferable that the critical molar ratio is set in accordance with a type of the hydrocarbon gas.

According to the method of operating a ruthenium catalyst reactor of the present configuration, the critical molar ratio is set in accordance with a type of the hydrocarbon gas, and thus various kind of hydrocarbon gas can be used as raw material for the synthetic gas.

BRIEF DESCRIPTION OF DRAWINGS

FIG. 1 is a plan view of a catalytic reactor according to a first embodiment.

FIG. 2 is a vertical sectional view of the catalytic reactor taken along a line II-II in FIG. 1.

FIG. 3 is a vertical sectional view of the catalytic reactor according to a second embodiment.

FIG. 7 is a block diagram showing a configuration of a ruthenium catalyst reactor for carrying out an operation method of the present invention.

DESCRIPTION OF EMBODIMENTS

Figure 4:
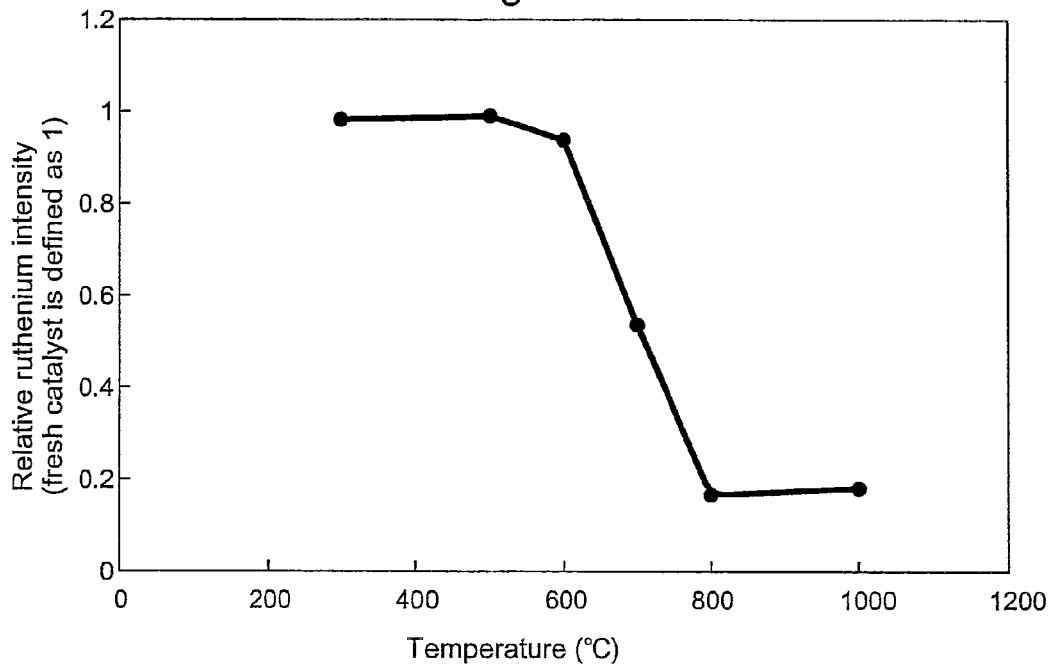
FIG. 4 is a graph showing temperature dependence of ruthenium intensity in a ruthenium catalyst in a nitrogen-oxygen atmosphere.

Hereinbelow, embodiments of the present invention will be described. It should be noted that the present invention is not limited to the configurations described in the following embodiments and drawings, and the present invention should be construed to include equivalents of the configurations of the present invention.

First Embodiment

FIG. 1 is a plan view of a catalytic reactor 100 (one example of a ruthenium catalyst reactor) according to a first embodiment. FIG. 2 is a vertical sectional view of the catalytic reactor 100 taken along a line II-II in FIG. 1. The catalytic reactor 100 is used for producing synthetic gas containing hydrogen and carbon monoxide by performing a partial oxidation reaction of a material fluid (hereinbelow, also referred to as "material gas") containing, for example, natural gas, oxygen, and steam, in the presence of a catalyst.

The catalytic reactor 100 of the present embodiment includes a reaction container 10, an introduction nozzle (introduction part) 20 and a supplementary container (supplementary part) 30 as main components. As shown in FIG. 2, the reaction container 10, the introduction nozzle 20 and the supplementary container 30 are placed inside a housing 40 of the catalytic reactor 100, and a gap between these components and the housing 40 is filled with a fireproof material 31. For the fireproof material 31, an inorganic oxide, such as alumina is preferably used.

As shown in FIG. 2, the reaction container 10 has a structure in which the followings are joined: an upper portion 1 formed of a truncated cone having a diameter reducing towards an upper side; a barrel portion 2 formed of a cylindrical body; and a lower portion 3 formed of a truncated cone having a diameter reducing towards the lower side.

It should be noted that, for the purpose of simplifying the explanation in the present specification, in the catalytic reactor 100 of a vertical type shown in FIG. 2, the upper side in the drawing is defined as "upper side" and the lower side as "lower side", as they look. From another viewpoint, in terms of a direction of a material gas flow, an upstream side can be defined as "upper side", and a downstream side as "lower side". Therefore, also in the catalytic reactor of a horizontal type, the expressions "upper side" and "lower side" used herein can be applied as-is. In other words, in the reaction container 10, the gas flows in a form of downflow.

The lower portion 3 is connected to a synthetic gas discharge pipe 32, and a catalyst receiver 4 having gas permeability is provided inside the lower portion 3. The catalyst receiver 4 may be formed of, for example, a porous metallic plate or firebrick which has sufficient strength to support the catalyst or the like placed thereabove. They are generally built up in a shape of an arch, as shown in FIG. 2, in order to enhance their strength. Above the catalyst receiver 4, in order to prevent the catalyst from falling off, ceramic balls 5 are filled up to a height level around a boundary between the barrel portion 2 and the lower portion 3. However, when a dimension of the pore of the catalyst receiver 4 (gas permeable structure) is smaller than a dimension of the catalyst and thus the catalyst receiver 4 alone can sufficiently prevent the catalyst from falling off, it is not necessary to provide the ceramic balls 5.

The barrel portion 2 and the upper portion 1 are filled with a catalyst 6 with a high catalytic activity suitable for the partial oxidation reaction of the material gas. For the catalyst 6, for example, there can be mentioned a catalyst including an inorganic oxide as catalyst carrier and a noble metal in a metallic state supported on a surface of the inorganic oxide by an impregnation process or the like. Examples of the inorganic oxide include alumina, titania, zirconia, and silica. For the noble metal, ruthenium may be used. Ruthenium is preferable since the catalytic activity is especially high in the partial oxidation reaction. The noble metals may be used alone or in combination. The catalyst carrier may be in any shape, such as sphere, pellet, ring and tube, and even in amorphous shape.

It should be noted that the entire catalyst 6 filled in the reaction container 10 herein is referred to as "catalytic layer 7".

To an inclined face 1a forming a side face of the upper portion 1, the introduction nozzle 20 for introducing the material gas to the reaction container 10 is connected. It should be noted that, in FIG. 2, the inclined face 1a is provided with a connecting port 1b to which a supply opening of the introduction nozzle (introduction part) 20 is connected, and alternatively, the supply opening of the introduction nozzle 20 may be directly connected to the inclined face 1a.

The introduction nozzle 20 includes: a double pipe 11 formed of an outer pipe 11a and an inner pipe 11b; and a blender 12 joined to the double pipe 11. As described above, in the catalytic reactor 100, the partial oxidation reaction of the material fluid containing natural gas, oxygen, and steam, as material gas, is performed in the presence of the catalyst 6, and for example in the double pipe 11, the natural gas is introduced to the outer pipe 11a, and the oxygen is introduced to the inner pipe 11b. The steam may be introduced in a form of a mixture with the natural gas flowing through the outer pipe 11a, in a form of a mixture with the oxygen flowing through the inner pipe 11b, or in a form of mixtures with both. The natural gas, the oxygen, and the steam which have passed through the double pipe 11 then pass through the blender 12, during which the three components are mixed to thereby obtain a homogeneous material gas. Examples of the blender 12 include a static blender having a spiral element incorporated therein, and a baffle type blender formed by alternately combining baffle plates having pores at different positions.

As shown in FIG. 2, the introduction nozzle 20 configured as described above is connected to the inclined face 1a of the upper portion 1 of the reaction container 10, in a direction inclined downward from above a horizontal plane. The reason for connecting in this manner is to suppress a flow of the catalyst 6 which may otherwise be caused by a supply pressure of the material gas. However, in a case where the supply pressure of the material gas is not so high and the catalyst 6 can be stabilized during the operation of the catalytic reactor 100, the introduction nozzle 20 may be connected to the reaction container 10 in the horizontal direction.

In addition, as shown in FIG. 1, a plurality of the introduction nozzles 20 are connected to the reaction container 10 at even angular intervals relative to a center of the reaction container 10 when seen from above. With this configuration, the material gas fed from the introduction nozzle 20 is distributed entirely inside the reaction container 10 and brought into contact evenly with the catalyst 6, and the partial oxidation reaction can be allowed to proceed efficiently.

It should be noted that, in FIG. 1, the number of the introduction nozzles (introduction parts) 20 connected to the reaction container 10 is three, and alternatively, the number may be changed as needed. For example, in an embodiment which will be described below, five introduction parts (20a-20e) are provided so as to correspond to different gases (see FIG. 7).

When the material gas is fed from the introduction nozzle 20 to the reaction container 10 and the catalyst 6 is brought into contact with the material gas to allow the partial oxidation reaction to proceed, a temperature of the reaction container 10 is raised due to heat of reaction. As the temperature is raised, the reaction container 10 undergoes thermal expansion. Accordingly, an internal volume of the reaction container 10 increases and thus the entire catalyst 6 filled therein may be moved downward. In other words, the catalytic layer 7 formed of the catalyst 6 shrinks. As a result, in the upper portion 1 of the reaction container 10, a space may be generated, for example, around the supply opening of the introduction nozzle 20, due to the reduction in a filling height level of the catalyst 6.

Also in a case where the reaction container 10 is not filled with the catalyst 6 in a close packed state at the beginning, the catalytic layer 7 shrinks during the operation of the catalytic reactor 100, and the filling height level of the catalyst 6 is reduced, which may leads to the generation of a space.

Accordingly, above the reaction container 10 in the catalytic reactor 100 of the present embodiment, the supplementary container 30 is provided in which a supplementary catalyst 6a is stocked which is used for replenishing a reduced volume generated by the reduction in the filling height level of the catalyst 6 in the reaction container 10 due to the factors as described above. As shown in FIG. 2, the supplementary container 30 is connected to an upper end side of the upper portion 1 of the reaction container 10. Of course, the supplementary catalyst 6a filled in the supplementary container 30 is of the same type as that of the catalyst 6. In addition, a filling height level H1 of the supplementary catalyst 6a is adjusted above a height level H2 at which the material gas is fed from the introduction nozzle 20 to inside the reaction container 10 (in FIG. 2, a position of the connecting port 1b provided in the inclined face 1a of the upper portion 1 corresponds to the height level H2 at which the material gas is fed). Therefore, even when the catalytic layer 7 shrinks due to, for example, the thermal expansion of the reaction container 10 and the movement of the catalyst 6 to the close packed state, a volume reduction region generated by the shrink is immediately filled with the supplementary catalyst 6a from the supplementary container 30 and thus in a flow pathway of the material gas in the reaction container 10 (i.e., a pathway from the introduction nozzle 20, through the upper portion 1, the barrel portion 2, and the lower portion 3 in this order to the synthetic gas discharge pipe 32), substantially no space is generated. As a result, if a feed rate of the material gas from the introduction nozzle 20 is constant, a feed linear velocity in the reaction container 10 is retained constant, and thus the excellent partial oxidation reaction can be retained. Referring back to the present inventors' experience, it is desirable that a volume of the supplementary container 30 be made 2% or more of a combined volume of a volume of the upper portion 1 and a volume of the barrel portion 2 of the reaction container 10.

In order to rapidly and surely replenishing the supplementary catalyst 6a inside the supplementary container 30 to the reaction container 10 when the catalytic layer 7 shrinks, as shown in FIG. 2, it is preferred that a weight 33 is provided above the supplementary catalyst 6a. The weight 33 is configured to function as biasing means for biasing the supplementary catalyst 6a to the reaction container 10. When the filling height level of the catalyst 6 is reduced, the supplementary catalyst 6a is immediately pushed out downward due to the weight 33, and therefore, the generation of the space in the flow pathway of the material gas in the reaction container 10 can be rapidly and surely prevented.

It should be noted that the weight 33 is formed of a member which does not react with the material gas (e.g., ceramic block, and metal covering ceramic). An upper side of the weight 33 is sealed with a lid 34 so as to prevent the material gas from leaking on the upper side.

Alternatively, instead of the weight 33, for example, a back face of the lid 34 may be provided with an elastic body (not shown) formed of a material which does not react with the material gas, and the supplementary catalyst 6a may be biased to the reaction container 10, by an elastic force of the elastic body.

Second Embodiment

FIG. 3 is a vertical sectional view of a catalytic reactor 200 according to a second embodiment. In the second embodiment, components which are the same as those described in the first embodiment are designated with the same reference characters, and thus a duplicate description is omitted.

The catalytic reactor 200 of the present embodiment includes the reaction container 10 and the introduction nozzle (introduction part) 20 as main components. As shown in FIG. 3, the reaction container 10 and the introduction nozzle 20 are placed inside the housing 40 of the catalytic reactor 200, and a gap between these components and the housing 40 is filled with the fireproof material 31.

As shown in FIG. 3, the reaction container 10 has the barrel portion 2 formed of a cylindrical body. In other words, unlike the catalytic reactor 100 of the first embodiment, the reaction container 10 does not have the upper portion 1 and the lower portion 2.

The barrel portion 2 is filled with the catalyst 6 which has a high catalytic activity suitable for the partial oxidation reaction of the material gas. The material for forming the catalyst 6, the shapes of the catalyst 6, the production method of the catalyst 6, and the like are the same as those described for the first embodiment.

In addition, in order to introduce the material gas to the reaction container 10, the introduction nozzle 20 which is the same as described in the first embodiment is connected to a side face 2a of the barrel portion 2. Herein, the introduction nozzle 20 is connected to the side face 2a of the barrel portion 2 in the horizontal direction or the direction inclined downward from above the horizontal plane. The filling height level H1 of the catalyst 6 filled in the reaction container 10 is adjusted above the height level H2 at which the material fluid is fed from the introduction nozzle 20 to inside the reaction container 10 (in FIG. 3, a position of a connecting port 2b provided in the side face 2a of the barrel portion 2 corresponds to the height level H2 at which the material gas is fed). Therefore, even when the catalytic layer 7 shrinks and the filling height level of the catalyst 6 is reduced to some extent due to, for example, the thermal expansion of the reaction container 10 and the movement of the catalyst 6 to the close packed state, the catalyst 6 is still present around a boundary region between the introduction nozzle 20 and the reaction container 10, and thus the material gas is prevented from remaining around the supply opening of the introduction nozzle 20, and the feed linear velocity of the material gas is prevented from being lowered which may otherwise cause an abnormal reaction. As a result, if the feed rate of the material gas from the introduction nozzle 20 is constant, the feed linear velocity in the reaction container 10 is retained constant, and thus the excellent partial oxidation reaction can be retained.

In addition, since the introduction nozzle 20 is connected to the reaction container 10 in the horizontal direction or the direction inclined downward from above the horizontal plane, the catalyst 6 in the reaction container 10 does not flow, allowing the partial oxidation reaction to proceed with stability.

The catalytic reactor 100 according to the present invention has been described above. Hereinbelow, an example in which the catalytic reactor 100 utilizing the ruthenium catalyst is used in the partial oxidation reaction of hydrocarbon will be described. First, experiments performed by the present inventors with respect to "critical molar ratio" as referred to in the present invention will be explained, and next an actual operation will be described.

<Antiscattering Condition of Ruthenium Catalyst>

During the operation of a ruthenium catalyst reactor, in order to prevent scattering of ruthenium in the ruthenium catalyst in advance, it is necessary to grasp a condition of ruthenium in the ruthenium catalyst for scattering, which had not been elucidated. Therefore, first, an experiment was performed for examining how the ruthenium catalyst behaves when a temperature condition changes in an oxidative atmosphere.

FIG. 4 is a graph showing temperature dependence of ruthenium intensity contained in the ruthenium catalyst in a nitrogen-oxygen atmosphere. In the experiment, this unused fresh ruthenium in the ruthenium catalyst was quantified by fluorescent X-ray analysis, and the measured signal strength of ruthenium was defined as relative intensity of 1. When the ruthenium catalyst was gradually heated from an ordinary temperature in the nitrogen-oxygen atmosphere, as shown in FIG. 4, relative Ru intensity began to decrease at 500° C. and rapidly reduced after 600° C. Above 800° C., the relative Ru intensity became approximately constant at around less than 0.2. From this result, it was found that when ruthenium in the ruthenium catalyst in the nitrogen-oxygen atmosphere was heated to or above 600° C., it was oxidized to hexavalent $RuO_3$ or octavalent $RuO_4$ and the scattering was started, and when the temperature reached approximately 800° C., most ruthenium at least on a surface of the ruthenium catalyst scattered.

Next, an experiment was performed for examining to what degree the scattering of ruthenium in the ruthenium catalyst can be suppressed, when hydrogen as an example of reduction gas is added to the nitrogen-oxygen atmosphere. The experiment was performed in the same nitrogen-oxygen atmosphere at 800° C. at which ruthenium nearly completely scattered as described in FIG. 4.

Figure 5:
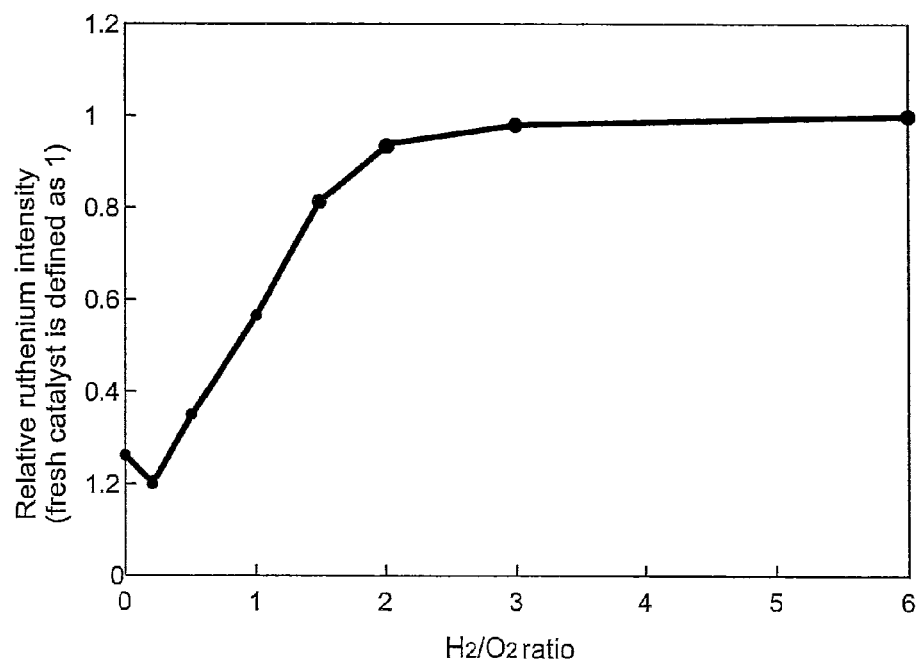
FIG. 5 is a graph showing $H_2/O_2$ ratio dependence of the ruthenium intensity in the ruthenium catalyst in a nitrogen-hydrogen-oxygen atmosphere.

FIG. 5 is a graph showing $H_2/O_2$ ratio dependence of the ruthenium intensity in the ruthenium catalyst in a nitrogen-hydrogen-oxygen atmosphere. With respect to the ruthenium catalyst retained at 800° C., as a proportion of hydrogen in an atmosphere became larger, the relative Ru intensity was raised, and when a $H_2/O_2$ ratio became 3, the relative Ru intensity became approximately 1. It was found that the ruthenium catalyst in this condition during usage was nearly the same as the fresh catalyst.

Further, also with respect various hydrocarbon gases used as reducing gas, similar confirmatory experiments to the experiment shown in FIG. 5 were performed. In this experiment, in order to satisfy an actual operating condition of the ruthenium catalyst reactor, gas containing nitrogen-hydrocarbon gas-hydrogen-steam-oxygen was used as atmosphere.

In addition, a proportion of hydrocarbon gas in an atmosphere is represented by a $C/O_2$ ratio. A flow rate of each gas was as follows: 120 cc/min for oxygen, 120 cc/min for steam, 24 cc/min for hydrogen, 0-180 cc/min for hydrocarbon gas, and the balance of the flow rate for nitrogen, with a total gas flow rate of 833.3 cc/min.

Figure 6:
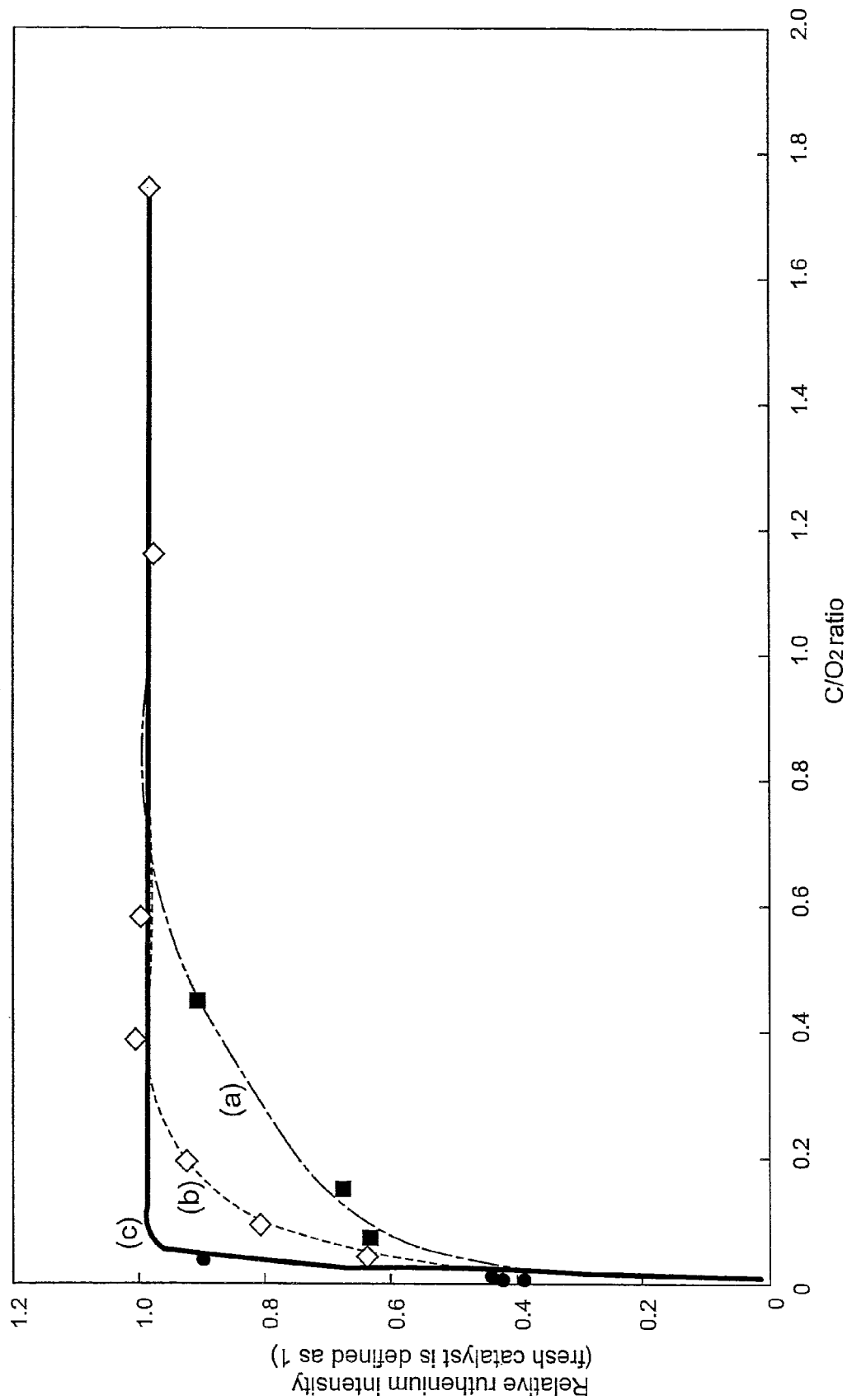
FIG. 6 is a graph showing $C/O_2$ ratio dependence of the ruthenium intensity in the ruthenium catalyst in a nitrogen-hydrocarbon gas-hydrogen-steam-oxygen atmosphere.

FIG. 6 is a graph showing $C/O_2$ ratio dependence of the ruthenium intensity in the ruthenium catalyst in a nitrogen-hydrocarbon gas-hydrogen-steam-oxygen atmosphere. (a) shows a case where methane was used as hydrocarbon gas. (b) shows a case where natural gas was used as hydrocarbon gas. (c) shows a case where propane was used as hydrocarbon gas.

As shown in (a), in the case of methane, with respect to the ruthenium catalyst retained at 800° C., as a proportion of methane in an atmosphere became larger, the relative Ru intensity was raised, and when the $C/O_2$ ratio became 0.8, the relative Ru intensity became approximately 1. It was found that the ruthenium catalyst in this condition during usage was nearly the same as the fresh catalyst.

As shown in (b), in the case of natural gas (in this case, prepared as simulated natural gas containing methane (88%), ethane (6%), propane (4%), and butane (2%)), with respect to the ruthenium catalyst retained at 800° C., as a proportion of natural gas in an atmosphere became larger, the relative Ru intensity was raised, and when the $C/O_2$ ratio became 0.4, the relative Ru intensity became nearly 1. It was found that the ruthenium catalyst in this condition during usage was nearly the same as the fresh catalyst.

As shown in (c), in the case of propane, with respect the ruthenium catalyst retained at 800° C., as a proportion of propane in an atmosphere became larger, the relative Ru intensity was increased, and when the $C/O_2$ ratio became 0.1, the relative Ru intensity became nearly 1. It was found that the ruthenium catalyst in this condition during usage was nearly the same as the fresh catalyst.

From the results above, it was elucidated that in any hydrocarbon gas, when a molar ratio ($C/O_2$) of carbon and oxygen contained in hydrocarbon gas is less than a predetermined value, the scattering of ruthenium occurs due to oxidization of ruthenium in the ruthenium catalyst to hexavalent $RuO_3$ or octavalent $RuO_4$; but when the molar ratio is retained at or above the predetermined value, the relative ruthenium intensity can be retained at approximately 1, and thus ruthenium in the ruthenium catalyst can be prevented from scattering. Such a condition of ruthenium in the ruthenium catalyst for scattering (in other words, condition for preventing ruthenium in the ruthenium catalyst from scattering) is a novel fact elucidated for the first time by intensive and extensive studies by the present inventors.

Accordingly, the present inventors have utilized this condition of ruthenium in the ruthenium catalyst for scattering and established the method of operating the ruthenium catalyst reactor which can prevent ruthenium in the ruthenium catalyst from scattering in advance.

<Method of Operating Ruthenium Catalyst Reactor>

FIG. 7 is a block diagram showing a configuration of the ruthenium catalyst reactor 100 for carrying out the operation method of the present invention. The ruthenium catalyst reactor 100 is provided with the ruthenium catalyst reaction container (reaction container) 10 having the ruthenium catalyst 6 therein. To the ruthenium catalyst reaction container 10 are connected the hydrocarbon gas introduction part 20a, the oxygen introduction part 20b, the steam introduction part 20c, the hydrogen introduction part 20d, and the nitrogen introduction part 20e. A flow rate of each gas introduced to the ruthenium catalyst reaction container 10 through the corresponding introduction parts 20a-20e is measured with a flow rate measurement unit 40. Results of the measurement are sent to a control unit 50, and from the flow ratio of each gas, $C/O_2$ or $H_2/O_2$ is obtained as molar ratio. When $C/O_2$ is obtained, a computation is performed while a carbon number in a molecule of the introduced hydrocarbon gas is taken into account. For example, in a case where the hydrocarbon gas is propane ($C_3H_8$), the measured flow rate is tripled in accordance with the number of carbon atoms, and as a ratio of this value to the flow rate of oxygen, $C/O_2$ is obtained.

In addition, a temperature of the ruthenium catalyst 6 in the ruthenium catalyst reaction container 10 is measured with a temperature measurement unit 60. Herein, the temperature measurement unit 60 is configured to measure the temperature of the ruthenium catalyst 6, especially around an outlet of the ruthenium catalyst reaction container 10, as shown in FIG. 7. With this configuration, an excessive temperature raise that may occur during the partial oxidation reaction can be detected. The measurement result by the temperature measurement unit 60 is sent to the control unit 50.

The molar ratio and the temperature of the ruthenium catalyst 6 described above are continuously or intermittently monitored by the control unit 50, as criterion for state change of the ruthenium catalyst 6.

The control unit 50 is configured to compare the molar ratio ($C/O_2$ or $H_2/O_2$), which has been obtained based on the flow rate of each gas and sent from the flow rate measurement unit 40, with a critical molar ratio stored in a storage unit 70.

Based on the confirmatory experiments described above with reference to FIGS. 5 and 6, the critical molar ratio for each gas is set in the following manner (represented as [gas species: critical molar ratio]): [hydrogen: 3], [methane: 0.8], [natural gas: 0.4], and [propane: 0.1]. It should be noted that, in a case where hydrocarbon gas is used, all of the molar ratios ($C/O_2$) at which the scattering of ruthenium in the ruthenium catalyst 6 occurs are less than one, and thus the critical molar ratio may be set to one, to be on the safe side.

For example, in a case where natural gas is used as reaction gas to be introduced to the ruthenium catalyst reaction container 10, the control unit 50 may be configured to continuously or intermittently monitor the molar ratio ($C/O_2$) of "carbon contained in the natural gas" and "oxygen" supplied to the ruthenium catalyst reaction container 10 having the ruthenium catalyst 6 therein. In this case, during the operation of the ruthenium catalyst reactor 100, when the molar ratio ($C/O_2$) is reduced to become close to the critical molar ratio (0.4) based on the amount of each gas supply, the control unit 50 closes a valve 21b of the oxygen introduction part 20b so as to stop the oxygen supply to the ruthenium catalyst reaction container 10, before the molar ratio ($C/O_2$) falls below the critical molar ratio (0.4). Accordingly, the molar ratio ($C/O_2$) is increased (in other words, a reductive atmosphere is obtained), and ruthenium in the ruthenium catalyst 6 is prevented from being oxidized to a volatile ruthenium oxide ($RuO_3$ or $RuO_4$). As a result, the scattering of ruthenium during the operation of the ruthenium catalyst reactor 100 can be prevented, and the partial oxidation reaction can be allowed to proceed with stability.

In an application in which the synthetic gas having a $H_2/CO$ ratio of approximately 2 is desired (e.g., GTL production and methanol production), it is preferred that the partial oxidation reaction performed using the ruthenium catalyst reactor 100 of the present embodiment is performed in a condition in which the temperature around the outlet of the ruthenium catalyst reaction container 10 (this temperature is approximately the same as that of the synthetic gas discharged from the ruthenium catalyst reaction container 10) becomes 900-1,100° C. The temperature below 900° C. is not preferable since the $H_2/CO$ ratio becomes high. To the contrary, the temperature above 1,100° C. is not preferable since the $H_2/CO$ ratio becomes low.

In the present embodiment, the partial oxidation reaction which is allowed to proceed in the presence of the ruthenium catalyst 6 is performed in a temperature range of 900-1,100° C. which is a preferable temperature condition, and thus the synthetic gas can be efficiently produced from the hydrocarbon gas as raw material.

In the ruthenium catalyst reactor 100 according to the embodiment described above, the ruthenium catalyst reaction container 10 is configured to be supplied with hydrocarbon gas, steam and oxygen. Alternatively, the ruthenium catalyst reaction container 10 may be configured to be supplied with hydrocarbon gas, steam and air. To put it another way, a source for supplying oxygen to the ruthenium catalyst reaction container 10 may be any source as long as it is oxygen-containing gas and thus other than pure oxygen, for example, air may be used as oxygen source. In this case, the molar ratio ($C/O_2$) of carbon contained in hydrocarbon gas and oxygen contained in air is obtained and the supply of air to the ruthenium catalyst reaction container 10 is stopped before the molar ratio ($C/O_2$) is reduced and falls below the critical molar ratio at which the scattering of the ruthenium in the ruthenium catalyst 6 is generated.

Moreover, the control unit 50 may be also configured to close and open a valve 21a of the hydrocarbon gas introduction part 20a, a valve 21c of the steam introduction part 20c, a valve 21d of the hydrogen introduction part 20d, or a valve 21e of the nitrogen introduction part 20e, in appropriate timing, based on information obtained from the flow rate measurement unit 40 or the temperature measurement unit 60.

It should be noted that, as the ruthenium catalyst reactor, the above-described catalytic reactor (see FIG. 2) is preferably used, but the catalytic reactor is not limited to this reactor. The present invention can be applied to any catalytic reactor using the catalyst mainly formed of ruthenium, since the effect of preventing the ruthenium catalyst from scattering can be attained.

The invention claimed is:

1. A method of operating a ruthenium catalyst reactor comprising steps of: supplying hydrocarbon gas, steam and oxygen-containing gas to a reaction container having a ruthenium catalyst therein; allowing a partial oxidation reaction to proceed in the presence of the ruthenium catalyst; and producing synthetic gas containing hydrogen and carbon monoxide, the method further comprising steps of:
monitoring a molar ratio ($C/O_2$) of carbon contained in the hydrocarbon gas and oxygen contained in the oxygen-containing gas which are supplied to the reaction container, and stopping the supply of the oxygen-containing gas to the reaction container before the molar ratio ($C/O_2$) is reduced below a critical molar ratio in terms of molar ratio ($C/O_2$) at which scattering of ruthenium in the ruthenium catalyst is generated, a different molar ratio ($C/O_2$) being adopted as the critical molar ratio in accordance with a type of the hydrocarbon gas, with the critical molar ratio ($C/O_2$) being set to 1 or less.

2. The method of operating a ruthenium catalyst reactor according to claim 1, wherein the partial oxidation reaction is performed with a condition in which a temperature around an outlet of the reaction container is in a range of 900-1,100° C.

3. The method of operating a ruthenium catalyst reactor according to claim 1, wherein the critical molar ratio is set to 0.8, 0.4 and 0.1 when the hydrocarbon gas is methane, natural gas, and propane, respectively.

4. A method of operating a ruthenium catalyst reactor comprising steps of: filling a reaction container of the catalytic reactor with a ruthenium catalyst formed of an inorganic oxide carrier and ruthenium supported thereon, with a filling height level of the catalyst filled in the reaction container being adjusted above a height level at which a material fluid is fed from an introduction part to inside the reaction container; supplying a mixed gas mainly containing hydrocarbon, oxygen-containing gas and steam as the material fluid to the reaction container; allowing a partial oxidation reaction to proceed in the presence of the ruthenium catalyst; and producing synthetic gas containing hydrogen and carbon monoxide, the method further comprising steps of:

monitoring a molar ratio ($C/O_2$) of carbon contained in the hydrocarbon gas and oxygen contained in the oxygen-containing gas which are supplied to the reaction container, and stopping the supply of the oxygen-containing gas to the reaction container before the molar ratio ($C/O_2$) is reduced below a critical molar ratio in terms of molar ratio ($C/O_2$) at which scattering of ruthenium in the ruthenium catalyst is generated, a different molar ratio ($C/O_2$) being adopted as the critical molar ratio in accordance with a type of the hydrocarbon gas, with the critical molar ratio ($C/O_2$) being set to 1 or less.

5. The method of operating a ruthenium catalyst reactor according to claim 4, wherein the partial oxidation reaction is performed with a condition in which a temperature around an outlet of the reaction container is in a range of 900-1,100° C.

\* \* \* \* \*